E. GRAHAM.
COMPUTING SCALE.
APPLICATION FILED MAR. 6, 1917.
1,294,089.
Patented Feb. 11, 1919.
3 SHEETS—SHEET 1.
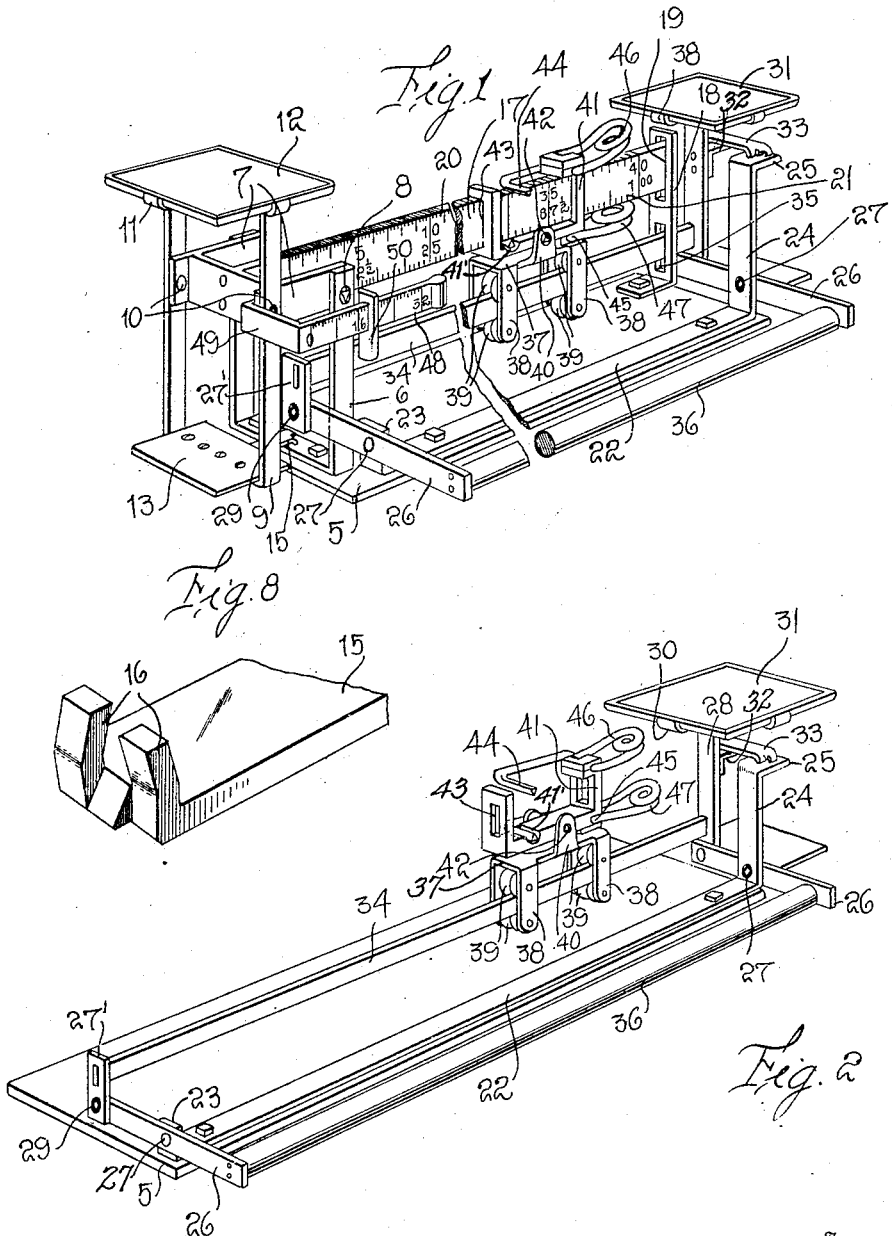
Inventor
EDINBURGH GRAHAM
By Watson E. Coleman
Attorney E. GRAHAM.
COMPUTING SCALE.
APPLICATION FILED MAR. 6, 1917.
1,294,089.
Patented Feb. 11, 1919.
3 SHEETS—SHEET 2
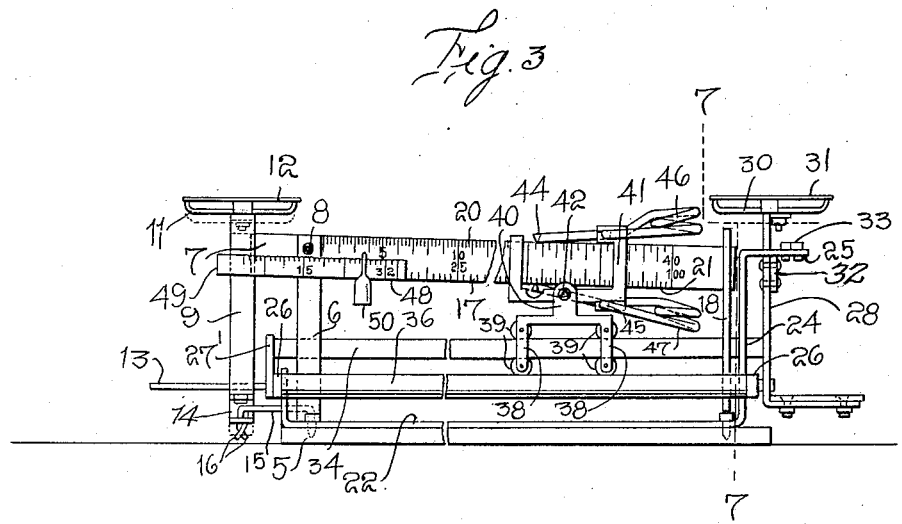
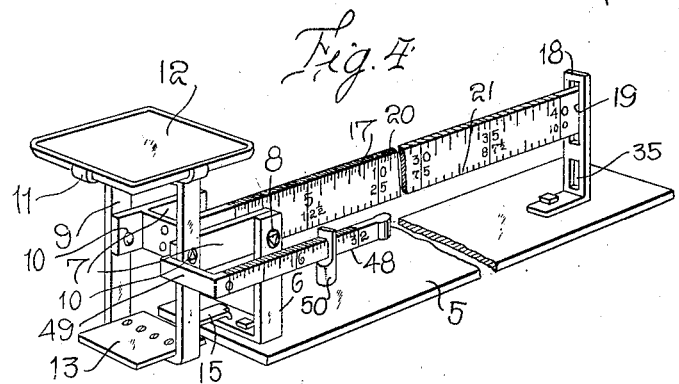
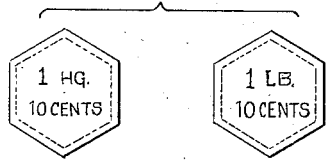
Inventor
EDINBURGH GRAHAM
By Watson E. Coleman
Attorney

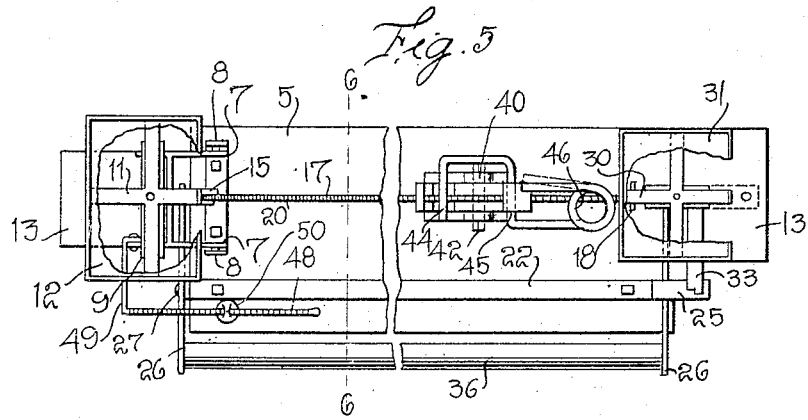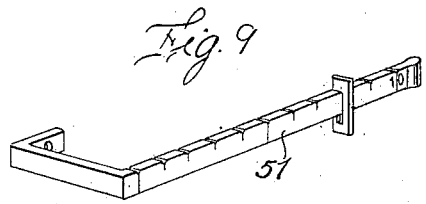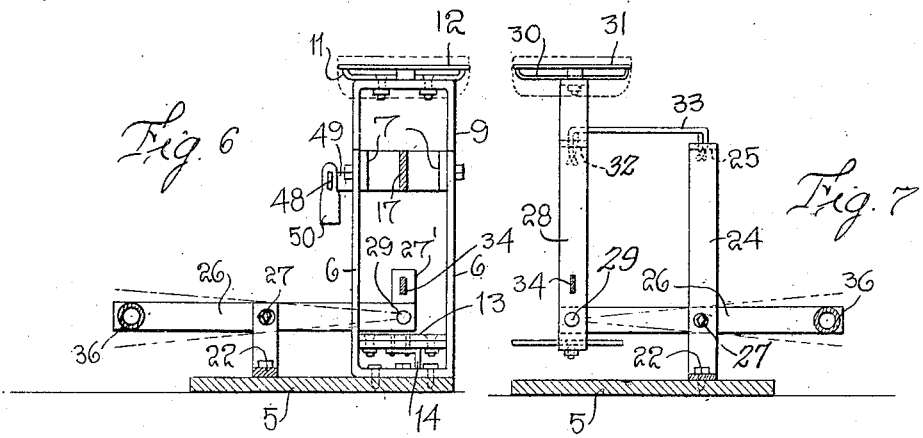

UNITED STATES PATENT OFFICE.

EDINBURGH GRAHAM, OF AIKEN, SOUTH CAROLINA.

COMPUTING-SCALE.

1,294,089. Specification of Letters Patent. Patented Feb. 11, 1919.

Application filed March 6, 1917. Serial No. 152,955.

*To all whom it may concern:*

Be it known that I, EDINBURGH GRAHAM, a citizen of the United States, residing at Aiken, and the county of Aiken and State of South Carolina, have made certain new and useful Improvements in Computing-Scales, which the following is a specification.

This invention relates to computing scales and in general contemplates the provision of weighing scales of this type to be used by retailers in weighing goods and computing the price thereof, and for fixing the selling price per pound in accordance with the cost of the goods and the profit which it is desired to make thereon.

The invention has for another important object to materially simplify the construction of computing scales so that they may be produced at comparatively small manufacturing cost.

It is also another object of my invention to provide a weighing apparatus which will be very sensitive and highly accurate in its operation and which will not be affected by changes in temperature.

My present invention may therefore be briefly characterized as including a balanced weight beam, a goods receiving platform and a pivotally mounted frame supporting said platform, said frame including a beam disposed immediately beneath the weight beam, and a shiftable frame mounted on the weight beam and pivotally connected to a carriage mounted on said second named beam, said weight beam having graduated upper and lower edges indicative of the selling price of goods, and spring pressed index members on the sliding weight to coact with the respective graduated edges of the beam.

With the above and other objects in view, the invention consists in the improved combination, construction and relative arrangement of the several parts as will be hereinafter more fully described in detail, subsequently claimed and pointed out in the accompanying drawings in which like reference characters designate corresponding parts and wherein:

Figure 1 is perspective view illustrating one preferred embodiment of my improved computing scale;

Fig. 2 is a similar view of the bed plate, the goods receiving platform and its supporting frame and the shiftable balancing weight;

Fig. 3 is a side elevation of the scale;

Fig. 4 is a perspective view of the weight receiving platform and the scale beam;

Fig. 5 is a top plan view, certain parts being broken away;

Fig. 6 is a section taken on the line 6—6 of Fig. 5;

Fig. 7 is a section taken on the line 7—7 of Fig. 3;

Fig. 8 is a fragmentary perspective view of one of the stay levers;

Fig. 9 is a similar view of the detachable gram beam for the metric system of weights; and Fig. 10 is a plan view of weights for use in connection with the troy and metric weight system.

Referring in detail to the drawings, 5 designates a bed plate upon one end of which an inverted U-shaped vertically disposed support 6 is securely bolted or otherwise rigidly fixed. The spaced arms 7 of a casting are provided with knife edged pivots 8 which are mounted in the upper ends of the spaced portions of the support 6. Upon the arm 7 of said casting at their relatively opposite ends, vertical bars 9 are supported intermediate of their ends by the knife edge pivots indicated at 10. To the upper ends of the bars 9, a cruciform support 11 is fixed, said support being adapted to receive the weight pan or platform 12. The lower ends of the bars 9 are connected by a plate 13 upon which additional weights may be placed. To the underside of this plate 13 an angular bracket member 14 is fixed, and said member is provided with notches or recesses in its free end to receive the spaced lugs 16 formed on one end of a stay lever 15, and lugs being obliquely inclined in relatively opposite directions, as clearly shown in Fig. 8. Similar lugs on the opposite end of said lever are adapted for engagement in recesses or openings provided in the base portion of the support 6. This stay lever, while it is thus loosely connected at its ends to the support 6 and plate 13, will permit of the vertical movement of the pivotally mounted support 9, but will prevent the outward swinging movement of the lower end of said support.

One end of a scale beam 17 is riveted or otherwise securely fixed centrally to the transverse bar connecting the arms 7 of the pivotally mounted casting. The other end of this beam is loosely engaged for vertical movement in an opening 19 formed in the upper end of a vertical bar 18 which is fixed to the bed plate 5. This scale beam is graduated or notched upon its upper and lower edges and adjacent to the respective notched edges the beam is provided upon its side faces with the scales designated 20 and 21 respectively. The scale 20 is indicative of money values from one-quarter of a cent to forty cents per pound and the scale 21 from one cent up to $1.00 per pound. The graduation characters of the scale 20 are preferably white while the characters of the lower scale 21 are black so that the two scales can be readily distinguished one from the other.

A longitudinally extending bar 22 is fixed upon the bed plate 5 adjacent one of its edges and has vertically disposed end portions 23 and 24 respectively, the latter having a laterally projecting terminal 25. Upon the ends of this bar 22, a platform supporting frame is mounted, said frame including transversely extending bars 26 having the knife edge pivots 27 engaged in the ends of the bar 22. To the corresponding ends of the bars 26, upwardly extending bars 27′ and 28 are respectively connected by means of the pivots 29. The bar 28 has a support 30 fixed to its upper end similar to the support 11 above referred to which is adapted to receive the plate or platform 31 upon which the goods or other articles to be weighed are placed. An angular bracket element 32 is fixed to the vertical bar 28 and one end of a stay lever 33 similar to the lever 15 hereinbefore described is engaged in this bracket element, the other end of said element being loosely connected to the laterally projecting terminal 25 of bar 22.

The bars 27′ and 28 are rigidly connected to each other by a guide rail or bar 34 which is disposed immediately beneath and in vertical alinement with the weight beam 17, said guide rail extending loosely through a second vertical slot or opening 35 in the bar 18. The other or forward ends of the bars 26 are connected to each other by means of a rod 36.

A carriage 37 is provided upon its opposite ends with spaced depending arms indicated at 38 which straddles the rail 34 and between these arms the peripherally grooved rollers 39 are mounted to travel upon the upper and lower edges of said rail. The body plate of said carriage is further provided intermediate of its ends with spaced upwardly projecting ears 40 in which knife edge pivot bearings 42 of a shiftable frame 41 are engaged. This frame is of substantially U-shaped form and has vertical end portions provided with openings 43 through which the beam 17 is loosely engaged. Thus, said frame constitutes a connecting means between the bar 34 and the beam 17, whereby the weight of the load is imposed upon said beam. Upon one end of the frame 41 at the upper and lower sides thereof, the index members indicated 44 and 45 respectively are mounted. Each of these members is formed of a single length of resilient wire having an intermediate angular portion, as clearly seen in Fig. 5 of the drawings, which is mounted for rocking movement upon the frame 41. One end of each index member is angularly disposed across one edge of the scale beam for engagement in the notches thereof, and said member adjacent to its opposite end and on the relative opposite side of its medial angular portion is provided with a spring coil, said coils being designated 46 and 47 respectively. The other extremities of said index members have bearing engagement against the upper and lower sides respectively of the frame 41, and in such position of said members are yieldingly held upon the edges of the scale beam.

48 designates an ounce beam which has an angular end portion 49 fixed to one of the arms 7 of the pivoted metal casting. This beam is provided with a suitable scale and a shiftable balancing weight 50 is mounted thereon. When the metric system of weights is used, the beam 48 is detached, and the beam 51 illustrated in Fig. 9 of the drawings is substituted therefor. In practice, the distance between the pivots 8 and 10, constitutes the base or standard by which the edges of the weight beam 17 are graduated. Thus for instance, if the distance between these pivots is 5 inches, measuring from the neutral or zero point on the beam 17 which is directly opposite the pivot 8 five inches to the right, the graduation mark at this point will be 10, and five inches farther to the right the mark will be 20, and each five inch space on the beam is divided into 10 equal spaces, and each of these latter spaces may again be subdivided if desired. Thus as illustrated the scales on the upper edge of the beam may be used in weighing goods to be sold or bought at from one-fourth to forty cents per pound. The scale on the lower edge of the beam has a different value, and is used for weighing goods to be sold or bought at from one cent to one dollar per pound.

I have illustrated in Fig. 10, weights which I have designed for use in connection with the scale, but it will be understood that the present invention is not limited to any particular size or construction of these weights. The view at the left in Fig. 10 shows one of the weights to be used in connection with the avoirdupois or troy system and upon this weight in white letters and numerals is marked "One pound 10 cts." The weight member 41 is adjusted on the upper scale 20 of the beam to the point indicating the price per pound of the goods being weighed. The weight is then placed on the pan 12 and when the goods placed on the pan 31 balance the weight, the weight member indicates that the goods have a value of 10 cts, at the rate per pound for which the frame 41 is set. The weight shown on the right in Fig. 10 is to be used in connection with the metric system of weights and upon this weight in white letters appears "One hectogram 10 cts."

Having thus described the construction of the several parts of my improved computing scale the invention in practice is used and operated as follows:

In balancing the tare weight of materials, the sliding weight member 50 is adjusted to the number of ounces, or if it is desired to weigh even pounds, this weight is arranged on the beam at zero mark. Then a downward pressure is exerted on the coil 46 of the member 44 to lift the end of said member from the notch in the upper edge of the beam and the frame 41 is moved longitudinally on the beam 17 to engage the terminal of the frame 41 in the graduation notch 10 in the upper edge of the beam. Weights aggraegating the amount of material are then placed upon the platform 12, and the material is placed in a bag or other receptacle on the platform 31.

In order to determine the selling price of goods, the cost and the desired profit being known, the goods are placed upon the pan or platform 31, and upon the platform 12, weights of a currency value equal to the cost of the goods are placed. Additional weights to the amount of the profit desired to be realized on the sale of the goods are also placed on the platform 12. The member 44 is released from engagement with the upper edge of the scale beam, as above explained and the frame 41 shifted upon the beam to the proper position to balance the weights with the article or goods on the platform 31. Upon the release of pressure on the member 44, the end of this member will engage in a notch in the upper edge of the beam 17, thus indicating upon the scale 20 the selling price per pound. The same operation may of course be performed, using the scale 21, and the weights having the black numerals thereon.

In the sale of goods retailing at from one-fourth of a cent to forty cents per pound, the upper scale 20 on the beam 17 is used. The end of the lower index member 45 which is engaged with the underside of the frame 41 is first disengaged from the underside of said frame and forced laterally into engagement with the side face of the frame, said member being rocked upon the frame 41 and the angular end thereof disengaged from the notched lower edge of the beam 17. The frame 41 is recessed as at 41' to permit of this downward movement of the end of the member 45. The coil 46 of the member 44 is now forced downwardly to disengage this member from the upper edge of the scale beam and the frame 41 is moved on the the beam to engage the end of member 44 in the proper notch of the scale 20 indicating the selling rate of the goods. Weights aggregating the currency value of the goods being purchased are then placed on the platform 12. Finally the bag or other receptacle is placed on the platform 13 and the goods placed therein until there is an even balance of the scale beam 17. In this operation of the scale, weights having the white numerals thereon are used.

In the operation of the scale for selling goods at from one cent to one dollar per pound, the upper member 44 is disposed in operative position as above explained and the lower member 45 is used in conjunction with the lower scale 21 having the black graduation marks on the beam, the operation in all other respects being identical with the operation just described. In the latter operation, the weights having the black numerals are employed.

From the foregoing description taken in connection with the accompanying drawings, the construction, manner of operation and several advantages of the invention will be clearly and fully understood. The scale constructed as herein described has a very sensitive balance and will therefore be highly accurate in practical use. By mounting the frame 41 on the scale beam 17 and connecting this frame to the article or goods receiving platform through the medium of the traveling carriage, said frame may be very easily and quickly adjusted to the proper position along the beam 17. The mounting and construction of the index members 44 and 45 may be varied from that herein referred to, or any other desired means may be arranged upon the sliding frame for releasable engagement with the respective notched edges of the scale beam. The scale herein illustrated is particularly designed for counter use, but it will be apparent that with obvious modifications in the mounting and relative arrangement of the several parts, the apparatus may also be constructed for use as a platform scale such as is used in the weighing of coal, hay and other materials in large quantities. My improved computing scale as a whole is of comparatively simple construction, no springs or other elements liable to get out of order being employed. The scale may therefore be produced at relatively small manufacturing cost and will not be affected by changes in temperature.

While I have herein shown and described the preferred construction and relative arrangement of various elements, it is to be understood that the same are susceptible of considerable modification and I therefore reserve the privilege of adopting all such legitimate changes as may be fairly embodied within the spirit and scope of the invention as claimed.

Having thus fully described my invention, what I claim and desire to secure by Letters Patent is:

1. In a computing scale, a pivotally mounted scale beam, a weight receiving platform disposed above one end of the beam and pivotally mounted thereon, a pivotally mounted goods receiving platform having a rail disposed in spaced parallel relation to said beam, a shiftable frame on said beam, and means slidable upon said rail and operatively connected to said frame, said means and the frame being shiftable as a unit toward or from the respective platforms.

2. In a computing scale, a pivoted scale beam graduated upon its upper and lower edges, a frame shiftable on said beam, and resilient index members coacting with the respective graduated edges of the beam and each having a part manually adjustable to engage the frame and retain the index member in an inoperative position.

3. In a computing scale, a pivoted scale beam having a weight receiving platform on one end, said beam being provided upon its upper and lower edges with graduated price computing scales, a frame shiftable upon said beam, adjustable index members carried by the frame to coöperate with the respective scales on the beam, said index members being adapted for independent manual adjustment to dispose either of said members in an operative or inoperative position, a vertically movable goods receiving platform, and means operatively connecting said platform to the shiftable frame and including a part movable with said frame.

4. In a computing scale, a pivoted scale beam having a weight receiving platform on one end, said beam being provided upon its upper and lower edges with graduated price computing scales, a frame shiftable upon said beam, adjustable index members carried by the frame coöperative with the respective scales on the beam, said index members being adapted for independent manual adjustment to dispose either of said members in an operative or inoperative position, a vertically movable goods receiving platform, and means operatively connecting said platform to the shiftable frame including a rail disposed in parallel relation to the scale beam and in the vertical plane thereof, and a carriage mounted to travel on said rail and connected to the shiftable frame.

5. In a computing scale, a pivoted scale beam having a weight receiving platform on one end, said beam being provided upon its upper and lower edges with graduated price computing scales, a frame shiftable upon said beam, adjustable index members carried by the frame to coöperate with the respective scales on the beam, said index members being adapted for independent manual adjustment to dispose either of said members in an operative or inoperative position, a vertically movable goods receiving platform, and means operatively connecting said platform to the shiftable frame including a rail disposed in parallel relation to the scale beam and in the vertical plane thereof, and a carriage mounted to travel on said rail and pivotally connected to said shiftable frame.

6. In a computing scale, a scale beam pivotally supported at one of its ends, a weight receiving platform pivotally mounted on said end of the beam in spaced relation to the pivot thereof a shiftable frame on said scale beam, a vertically movable goods receiving platform, a common guide for said scale beam and the goods receiving platform, a rail movable with the platform and engaged in said guide, and means mounted to travel on said rail and pivotally connected to said shiftable frame.

EDINBURGH GRAHAM.

Copies of this patent may be obtained for five cents each, by addressing the "Commissioner of Patents, Washington, D. C."